United States Patent [19]
Specht et al.

[11] 3,959,629
[45] May 25, 1976

[54] ADJUSTABLE CODING REFLECTOR

[75] Inventors: Dieter Specht, Dhunn; Hans vom Stein, Wermelskirchen, both of Germany

[73] Assignee: Interrol Fordertechnik GmbH & Co. KG, Dhunn, Germany

[22] Filed: July 12, 1974

[21] Appl. No.: 487,868

[30] Foreign Application Priority Data
July 17, 1973 Germany.................. 2336246

[52] U.S. Cl. ............... 235/61.12 N; 235/61.11 E; 235/61.7 B; 340/146.3 K
[51] Int. Cl.² .................. G06K 19/06; G06K 7/14
[58] Field of Search ............ 235/61.7 B, 61.11 D, 235/61.11 E, 61.7 R, 61.12 R, 61.12 N, 61.12 M; 340/146.3 K; 250/568, 569, 570; 343/6.5

[56] References Cited
UNITED STATES PATENTS

| | | |
|---|---|---|
| 2,953,300 | 9/1960 | O'Brian.................. 235/61.12 R |
| 3,253,126 | 5/1966 | Baughman................ 235/61.11 E |
| 3,440,972 | 4/1969 | Sidebotham.............. 235/61.12 M |
| 3,502,851 | 3/1970 | Kakimoto................ 235/61.12 R |
| 3,521,280 | 7/1970 | Janco.................... 343/6.5 |
| 3,643,065 | 2/1972 | Dunigan.................. 235/61.7 R |
| 3,711,683 | 1/1973 | Hamisch.................. 235/61.12 N |
| 3,751,640 | 8/1973 | Daigle................... 235/61.11 E |

*Primary Examiner*—Daryl W. Cook
*Assistant Examiner*—Robert M. Kilgore

[57] ABSTRACT

An adjustable coding reflector for a photoelectronic target-controlled sorting and conveying installation having a base plate with at least one row of reflector positions extending parallel with the direction of movement of the goods with means for adjusting each reflector position to a reflecting or non-reflecting condition.

8 Claims, 11 Drawing Figures

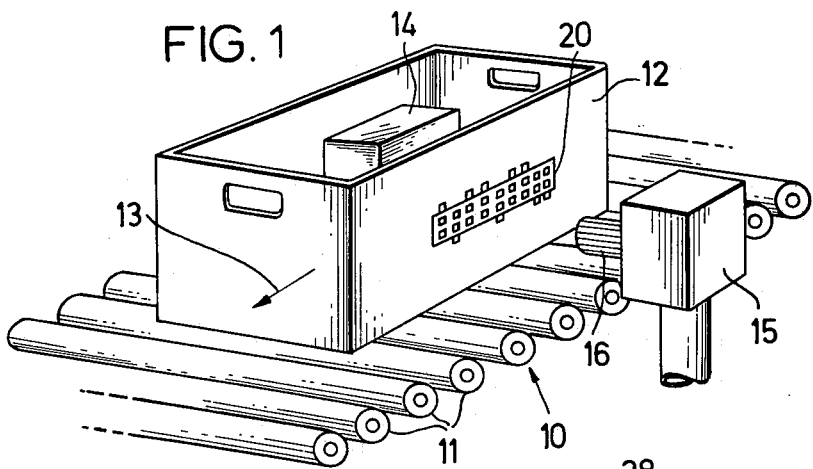
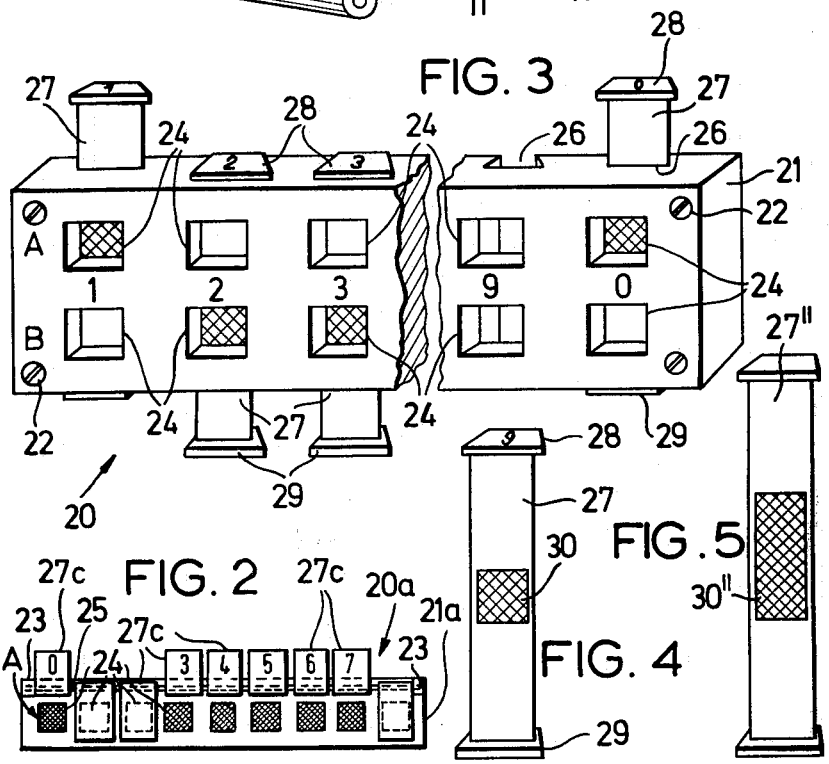

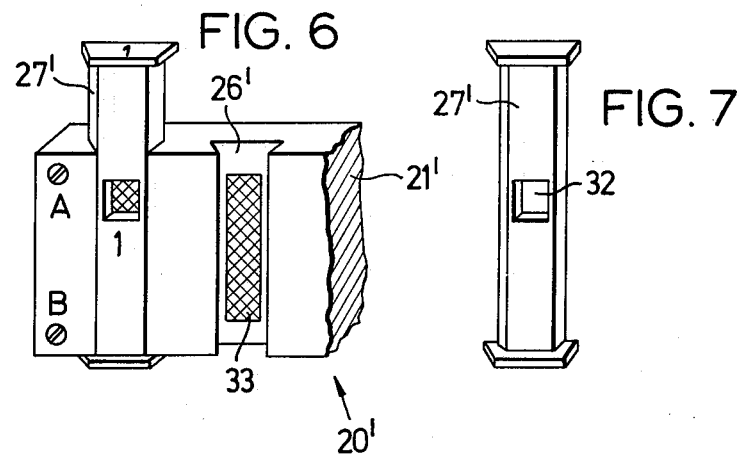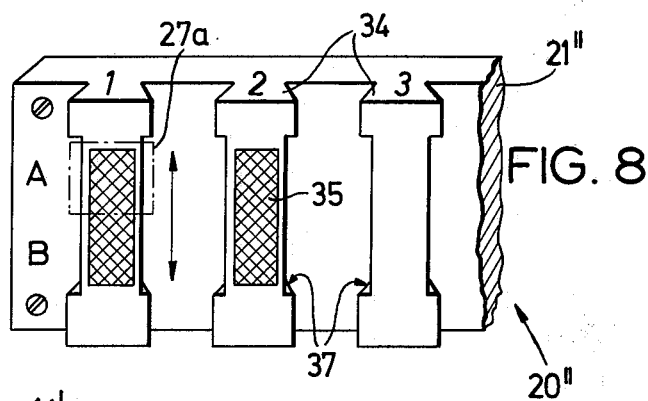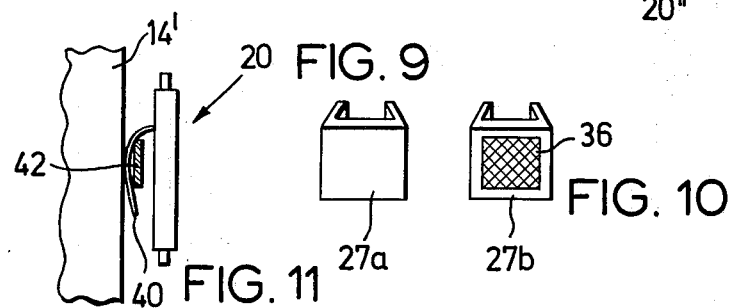

ADJUSTABLE CODING REFLECTOR

The invention relates to an adjustable coding reflector for photoelectronically target-controlled conveying, sorting, storage or like installations, with a base plate having at least one row of reflector positions extending parallel with the direction of movement of the goods or of the containers which hold them.

Photoelectronic code readers are known. They are in a position to receive light probably emitted by them themselves and reflected and of processing such reflected light electronically into commands for controlling or monitoring purposes etc. Serving as a reflecting means are coded reflection surfaces, for example imprints on cartons which pass by the code reader.

It is also known to use these photoelectronic code readers in conveying, sorting, storing or like installations for target-controlled conveyance, sorting, supervision, etc. In this case, a target-controlled conveyor plant has for example a large number of branch-routes, intermediate stores, etc., on which the goods being conveyed automatically seek their path. This is effected in that the goods conveyed are provided with coded reflectors, for example coded imprinted strips which are read by code readers disposed at the sides of the conveyor paths, whereupon the evaluating units associated with the code readers adjust or change the switches, drives and the like control units of the conveyor plant according to the target to which the relevant item of goods must travel.

Already known is an adjustable coding reflector which can be attached on transport containers for goods which have to be conveyed, the coding reflector having ten different reflector positions disposed on a circle, after the fashion of a clock, and being adjustable for example at the charging station of the target-controlled conveyor plant, according to the target to which the goods are to be directed, by rotation of a pointer to one of ten possible targets. The code readers set up along the conveying plant then guide the container to one of ten targets according to the setting of the pointer. By serially disposing two such clock-like adjustable coding reflectors on the transport containers and by appropriately doubling the code readers, it is in fact possible with this known coding reflector also automatically control hundred different routes, but the expenditure required is quite considerable and equally considerable is the risk of errors due to malfunction.

Finally, also known is an adjustable coding reflector which consists of an elongated base plate with a row of adjacently disposed reflector positions, one or two push members being displaceable along the base plate in order to mask one and/or another reflector position. Also with this known coding reflector, it is only possible automatically to control a limited number of routes.

The invention is based on the problem of providing an adjustable coding reflector with which, with a few simple manipulations, a very large number of different code data can be adjusted, so that for example in the case of a target-controlled conveyor plant, a very large number of targets can be adjusted with a few manipulations by means of such a coding reflector which can be attached to a conveying container or also separably fitted on the conveyed goods themselves. In this respect, it is intended that the coding-reflector according to the invention be not only easy to operate but also be very simple and inexpensive to produce and preferably usable with conventional code readers.

In order to resolve this problem, in the case of an adjustable coding reflector of the type described at the outset, it is according to the invention proposed that each individual reflector position be optionally reflectingly or non-reflectingly adjustable independently of all other reflector positions in the row or rows of reflector positions by slides, flaps, plugs or the like.

In the case of the coding reflector according to the invention, therefore, either only one or a plurality of adjacently disposed rows of reflector positions are provided, each individual reflector position being reflectingly or non-reflectingly adjusted by a handle, so that a number of different codes raised to a power with respect to the known coding reflectors, i.e. in other words an extremely large number of different routes can be automatically controlled for example in a target-controlled conveyor installation.

It is preferably envisaged that the individual reflector positions of several parallel rows of reflector positions be aligned with one another transversely of the direction of movement of the goods or of their containers and that a slide (or flap, plug or the like) be provided per reflector position in the row or rows, and by the adjustment of which and/or other of the aligned reflector positions can be set to reflect.

In the case of a coding reflector having two adjacently disposed rows of reflector positions, each row having ten reflector positions, by appropriately adjusting the ten slides, flaps, plugs or the like so that one and/or other of the superposed reflector positions reflects or so that none of these reflector positions reflects, it is possible automatically to adjust or control a number of different commands, for example different routes, multiplied to a power with respect to the conventional coding reflectors. Therefore, the operator has only to adjust at most ten slides with a few manipulations in order to be able to control several hundred different routes. By extending the rows of reflector positions or by providing a third or more rows of reflector positions, so the number of possible code settings can furthermore be multiplied virtually without limitation. The coding reflector itself consists only of a base plate which can be made as a simple synthetic plastics moulding, and a corresponding number of slides, flaps, plugs or the like which can be likewise injection moulded from synthetic plastics material.

The slides, flaps, plugs or the like may have a front face constructed as a reflector, the surface which is constructed as a reflector surface needing to have only the dimensions of a reflector position.

The coding reflector can either be secured by screws or adhesion to a transport container or it may be provided with an applicator for separable attachment to one of the items of goods, such an applicator being for example a clip, suction cap, etc.

Further objects, features and advantages of the invention will become manifest from the ensuing description of examples of embodiment which serve to explain and by no means to limit the idea underlying the invention, reference being made to the attached drawings, in which:

FIG. 1 is a perspective view of a portion of a roller track with a container which is provided with a coding reflector according to the invention, a code reader being disposed by the side of the roller track;

FIG. 2 is a front view of a first embodiment of a coding reflector according to the invention with only one row of reflector positions;

FIG. 3 is an enlarged view of another form of embodiment of coding reflector according to the invention;

FIG. 4 shows a slide for use with the coding reflector according to FIG. 3;

FIG. 5 is an alternative embodiment of the slide shown in FIG. 4;

FIG. 6 is a further form of embodiment of the coding reflector;

FIG. 7 shows in detail a slide for the coding reflector shown in FIG. 6;

FIG. 8 is a further alternative coding reflector according to the invention;

FIGS. 9 and 10 show two forms of embodiment of slides for use with the embodiment shown in FIG. 8, and FIG. 11 is a diagrammatic view of a possible method of attachment of the coding reflector according to the invention, on a packet for example.

FIG. 1 shows a short portion of a roller track 10 having rollers 11 which are intended to indicate a part of a comprehensive conveyor plant provided with numerous switches, intermediate stores, collectors, sorters, etc., the said conveyor plant being traversed in target-controlled fashion by the goods being conveyed. In the case of the example of embodiment illustrated, the goods shown at 14 are contained in transport containers 12 while target control is provided by, disposed by the sides of the conveyor paths, code readers 15 comprising an electronic evaluating unit or with which such an evaluating unit is associated, adjusting the (in the direction of conveyance, see arrow 13) successive switches, drives, etc., according to the code read. The known code reader 15 emits a beam of light through a tube 16 onto a coding reflector 20 according to the invention, by which the beam of light is reflected by correspondingly adjusted reflectors back into the code reader and is processed to produce an appropriate command.

FIG. 2 shows a first form of embodiment of the coding reflector 20a according to the invention. An elongated base plate 21a has on its front face a row of reflector positions A consisting for example of ten reflecting reflector positions 24. The reflector positions 24 are therefore simple circular or polygonal reflecting surfaces. Mounted in two bearings 23 above the row A of reflector positions is a spindle 25 on which one flap 27c per reflector position 24 is pivotable mounted. In FIG. 2, the second and third as well as the last flap 27c is closed over their reflector positions 24 so that they cover these latter, while the other flaps 27c are opened, thus exposing their reflector positions 24. It will be evident that by swinging the flaps 27c upwards or downwards accordingly, each individual reflector position 24 can be rendered reflecting or non-reflecting, the position then being read appropriately by the code reader 15 according to FIG. 1.

FIG. 3 shows a further embodiment of a coding reflector 20 according to the invention. This consists of a base plate 21 which is preferably injection moulded from plastics material and which can be secured by screws 22, glue or in some other manner to the side of the container 12. Extending parallel with the direction of conveyance 13, the base plate 21 has two superposed rows A, B of reflector positions, the individual reflector positions 1, 2, 3 . . . 9, 0 of which are formed by windows 24.

Constructed behind the windows 24 and back tapered transversely with respect to the rows A, B of reflector positions are grooves 26 in which slides 27 which are likewise injection moulded from synthetic plastics material, can be displaced. The slides 27 ideally each have one upper and one lower end or abutment plate 28, 29 and are provided on their front face (see FIG. 4) with a reflector 30 which in known manner is so constructed that it throws the beam of light striking it always back in the direction of the angle of incidence, i.e. it does no harm if the coding reflector 20 passes in front of the code reader 15 in other than an exactly perpendicular relationship.

The reflector 30 is so disposed on the slide 27 that when the slide is pushed upwards into its extreme position (slide No. 1 in FIG. 3) this reflector 30 is situated behind the upper window 24, while the reflector 30 is disposed behind the lower window when the slide 27 is pushed into the bottom extreme position (e.g. position 2 in FIG. 3). For the sake of greater clarity, the position Nos. 1 – 0 may also be applied on the upper face of the abutment plates 28.

On the loading side of the target-controlled conveyor plant, the operator adjusts the slides 27 according to the route to be travelled by the container 12, the number of controllable routes in the rows of reflector positions being in each case doubled from reflector position to reflector position (2-4-8-16-32-64 . . . . 1024). Therefore, each further reflector position (corresponding to the individual windows 24) in the rows A and B of reflector positions can in turn double the number of routes possible.

It will be evident, therefore, that the entirely simple and adjustable coding reflector 20 can be easily set by the operator to an extremely large multiplicity of routes. It has already been mentioned that naturally also further rows of reflector positions can be provided, but then other than the conventional code readers or possibly several serially disposed code readers will be required.

While the slide is so constructed according to FIG. 4 that its reflector 30 is, in the upper extreme position, disposed behind the upper window 24 and in the lower extreme position is behind the lower window 24 of the base plate 21, the slide 27'' as shown in FIG. 5 can also be so constructed that it has altogether four settings: first of all, the two settings of the slide 27 as shown in FIG. 4 are possible, i.e. the reflector 30'' lies either behind the upper or behind the lower window 24; in addition, in the case of the slide shown in FIG. 5, however, the enlarged reflector surface can also be provided behind both windows and as a fourth position, the slide 27'' can be so disposed that no part of the reflector surface 30'' lies behind any of the windows 24.

In the case of the embodiment shown in FIG. 6, the coding reflector 20' has a base plate 21' with, disposed at the front, back-tapered grooves 26' in which corresponding slides 27' are displaceable and, as shown in FIGS. 6 and 7, have a window 32 which in the upper extreme position of the slide 27' is at the height of the reflector positions of the upper row A of reflector positions and in the low extreme position of the slide 27' lies at the height of the reflector positions of the bottom row B of reflector positions. The bottom of the grooves 26' is in this case provided with a reflector 33.

Naturally, however, the large-area reflector 33 in FIG. 6 may be dispensed with and in its place, a slide as shown in FIG. 4 or 5 (with a correspondingly reversed back-taper) may be used for the embodiment shown in FIG. 6, of which the reflector 30 corresponding to a reflector position is substantially smaller.

In the case of the embodiment shown in FIG. 8, the coding reflector 20" has a base plate 21" on the front of which back-tapered ribs 34 are provided which have close to their two ends end stops 37. In the case of such a coding reflector 20", continuous reflectors 35 may be provided either on the front face of the ribs 34, the reflectors then being masked by a slide member 27a according to FIG. 9 in either the upper or lower half, or a slide 27b according to FIG. 10 may be used carrying on its front face a reflector 36 having the dimensions of the reflector position.

Naturally, numerous further alternative embodiments of the coding reflector according to the invention can be provided within the framework of the ability of a man skilled in the art. The reflector positions being made reflecting or non-reflecting as desired by means of flaps, slides, plugs or the like.

In the case of the embodiment shown in FIG. 1, it is envisaged that the coding reflector 20 be attached on a container 12 holding the goods 14 which require to be conveyed. Naturally, the coding reflector according to the invention can also be separably attached directly to an item of goods to be conveyed. It is shown in FIG. 11 for example that a coding reflector 20 can be attached to goods 14' by means of a bracket 40 which engages for example behind a metal strip 42 encircling the goods 14'. Similarly, suction cups, hooks, clips and the like could be used as a means of applying the coding reflector.

What is claimed is:

1. An adjustable coding reflector for marking objects to be subjected to a photoelectronic target-controlled selection installation, said installation including a scanner, said coding reflector comprising:
    a. a base plate having reflector positions constructed as windows therein, with at least one row of reflector positions extending parallel with the direction of movement of the objects;
    b. a selective adjustable slide at each individual reflector position having reflectors on the surfaces facing said scanner for selective adjustment to a reflecting condition by moving said slide in a direction normal to the movement of the objects; and
    c. at least one groove disposed on the back of said base plate, one of said slides being disposed in each of said grooves.

2. A coding reflector as claimed in claim 1, comprising stop means associated with each selective adjustment means to provide limits as to adjustment movement possible.

3. A coding reflector as claimed in claim 1, comprising a fastener for attaching the coding reflector to an object.

4. A coding reflector as claimed in claim 1, wherein said selective adjustment means comprises a flap adapted to cover or expose a respective reflective position.

5. An adjustable coding reflector for marking objects to be subjected to a photoelectronic target-controlled selection installation comprising:
    a. a base plate having at least one row of reflector positions extending parallel with the direction of movement of the objects and at least one groove on its front face with one portion of the back side of each groove formed as a reflector;
    b. an adjustable slide for each groove containing a window for gliding within said groove; said slice and groove combination forming a means for selective adjustment by moving said slide in a direction normal to the movement of said objects.

6. A coding reflector as claimed in claim 5, comprising stop means associated with each selective adjustment means to provide limits as to adjustment movement possible.

7. A coding reflector as claimed in claim 5, comprising a fastener for attaching the coding reflector to an object.

8. A coding reflector as claimed in claim 5, wherein said selective adjustment means comprises a flap adapted to cover or expose a respective position.

* * * * *